(12) United States Patent
Misumi et al.

(10) Patent No.: US 6,414,105 B2
(45) Date of Patent: *Jul. 2, 2002

(54) AROMATIC POLYCARBODIIMIDE AND SHEET THEREOF

(75) Inventors: Sadahito Misumi; Michie Sakamoto; Takami Hikita; Michio Satsuma; Amane Mochizuki, all of Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/795,220

(22) Filed: Mar. 1, 2001

Related U.S. Application Data

(63) Continuation of application No. PCT/JP99/04761, filed on Sep. 3, 1999.

(30) Foreign Application Priority Data

Sep. 3, 1998 (JP) .......................................... 10-267374
Jul. 12, 1999 (JP) .......................................... 11-197423

(51) Int. Cl.$^7$ .............................................. C08G 73/10
(52) U.S. Cl. ....................... 528/170; 528/310; 528/322; 528/353; 525/907; 428/473.5
(58) Field of Search ................................ 528/170, 353, 528/310, 322; 428/473.5; 525/907

(56) References Cited

U.S. PATENT DOCUMENTS 5,859,170 A * 1/1999 Sakamoto et al. .......... 528/170
6,051,677 A * 4/2000 Maeda et al. ................ 528/310
6,248,857 B1 * 6/2001 Misumi et al. .............. 528/170

FOREIGN PATENT DOCUMENTS

JP 4-279618 10/1992
JP 6-25101 4/1994

OTHER PUBLICATIONS

G. Greber, et al., "A New Synthesis of Isocyanates and Isothiocyanates", Angew, Chem. Internat. Edit. vol. 7, (1968) No. 12, 941.

Tod W. Campbell, et al. "Carbodiimides. IV. High Polymers Containing the Carbodiimide Repeat Unit", J. Org. Chem., vol. 28, pp. 2069–2075 (Aug. 1963).

Lyman et al. "Die Makromolekulare Chemie", vol. 67, pp. 1–9 (1963).

B.M. Shinde, et al. "Synthesis and Reactivities of Diisocyanates and Polyamides Therefrom", J. Polym. Mater., 6, pp. 25–30 (1989).

* cited by examiner

Primary Examiner—P. Hampton-Hightower
(74) Attorney, Agent, or Firm—Sughrue Mion, PLLC

(57) ABSTRACT

An aromatic polycarbodiimide comprising a structural unit represented by the following formula (I):

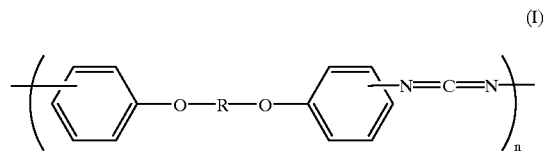

where R is an organic group having 3 or more carbon atoms, and n is an integer of 2 to 300, and a polycarbodiimide solution, a polycarbodiimide sheet, and an insulated coated electric wire which are prepared using the aromatic polycarbodiimide. The aromatic polycarbodiimide has high solubility in an organic solvent, satisfactory workability, and excellent heat resistance and humidity resistance. The insulated coated electric wire has excellent durability and is highly reliable under high pressure, high humidity conditions.

19 Claims, 7 Drawing Sheets

AROMATIC POLYCARBODIIMIDE AND SHEET THEREOF

This is a continuation application of International application PCT/JP99/04761 having an international filing dated of Sep. 3, 1999 and claims benefit of Japanese applications HE10-267374 and H11- 197423 filed Sep. 3, 1998 and Jul. 12, 1999, respectively.

BACKGROUND OF THE INVENTION

1. Field of the Invention

This invention relates to an aromatic polycarbodiimide, and its sheet. More particularly, the invention relates to an aromatic polycarbodiimide having high resistance to heat, a low dielectric constant, humidity resistance, and flexibility, and a sheet thereof.

2. Description of the Related Art

There have been known aromatic polycarbodiimides produced by polymerizing diphenylmethane diisocyanate (MDI) or tolylene diisocyanate (TDI) as a monomer. These aromatic polycarbodiimides are used as flame resistant films or heat resistant adhesives because of their excellent heat resistance.

These aromatic polycarbodiimide films do not generate a volatile gas or decomposed monomer even when they are exposed to high temperatures above 400° C. From this viewpoint, the aromatic polycarbodiimide films are heat resistant. However, they have low humidity resistance, and when heat-treated at 200° C. or higher, lose self-supporting properties, and become too brittle to be put to practical use. In addition, they have poor solubility in organic solvents, and low workability.

In recent years, electronic circuits have become compact in size, and light in weight. Along this line, electric wires and cables have been rendered thin, and lightweight. Thus, coating of an electric wire with a thin-walled thermosetting resin is used as very effect means. However, thinning of an electric wire by making the coating thin has its limits, so that thin electric wires are increasingly used.

Among thermosetting resins used as electric wire coating materials are epoxy resins, silicone resins, polyurethane resins, polyamide resins, polyimide resins, and polyesterimide resins. However, coating of a thin electric wire with any of these resins poses the problem that the electric wire is cut during coating, because of the high viscosity of the resin.

To avoid this problem, it is conceivable to lower the viscosity of the resin. For this purpose, the concentration of the resin may be lowered, or the molecular weight of the resin may be made low. However, lowering the concentration of the resin makes it difficult to coat the electric wire to a sufficient thickness. Decreasing the molecular weight of the resin, on the other hand, causes the problem that the coating of the resulting coated electric wire has low strength.

Publicly known polycarbodiimide resins are excellent in heat resistance and humidity resistance in a room temperature atmosphere. However, these resins are extremely unstable in a high pressure, high humidity environment such as in a pressure cooker test. Since the mechanical strength of a film formed from such resins is low, the coating reliability of the electric wire markedly declines.

Japanese Patent Application Laid-Open No. Hei 8-259693 and Japanese Patent Application Laid-Open No. Hei 8-259886 describe that carbodiimide-polyurethane copolymers have excellent heat resistance. However, these copolymers are unsuitable for coating thin electric wires, and they are insufficient in humidity resistance and coating reliability.

DISCLOSURE OF THE INVENTION

The inventors of the present invention have conducted intensive studies on various starting monomers and aromatic carbodiimide polymers to resolve the foregoing drawbacks of the conventional polycarbodiimides. As a result, they have found that the above problems can be solved by a polycarbodiimide having the following new skeleton, and have accomplished the present invention based on this finding.

The present invention has been described in detail with respect to preferred embodiments, and it will now be that changes and modifications may be made without departing from the invention in its broader aspects, and it is the intention, therefore, in the appended claims to cover all such changes and modifications as fall within the true spirit of the invention.

An aromatic polycarbodiimide according to the present invention is characterized by having a structural unit represented by the following formula (I):

$$\left( \phantom{x} \!\!\!\!\! \underset{}{\underbrace{\phantom{xxx}}} \!\!\!\!\! -O-R-O- \!\!\!\!\! \underset{}{\underbrace{\phantom{xxx}}} \!\!\!\!\! -N=C=N- \right)_n \quad (I)$$

where R is an organic group having 3 or more carbon atoms, and n is an integer of 2 to 300.

In the formula, n is preferably an integer of 2 to 100.

In the formula, R is preferably an alkylene group having 3 or more carbon atoms, more preferably 3 to 20 carbon atoms, especially 5 to 10 carbon atoms.

In the formula, R is preferably an alkylidene group having 3 or more carbon atoms.

A polycarbodiimide solution according to the present invention is characterized in that it is prepared by dissolving any one of the above aromatic polycarbodiimides in an organic solvent.

An insulated coated electric wire according to the present invention is characterized by being coated with a resin composition consisting essentially of any one of the aromatic polycarbodiimides.

A polycarbodiimide sheet according to the present invention is characterized by comprising a resin composition consisting essentially of any one of the aromatic polycarbodiimides.

The above and other objects, effects, features and advantages of the present invention will become more apparent from the following description of embodiments thereof taken in conjunction with the accompanying drawings.

DETAILED DESCRIPTION

Figure 1:
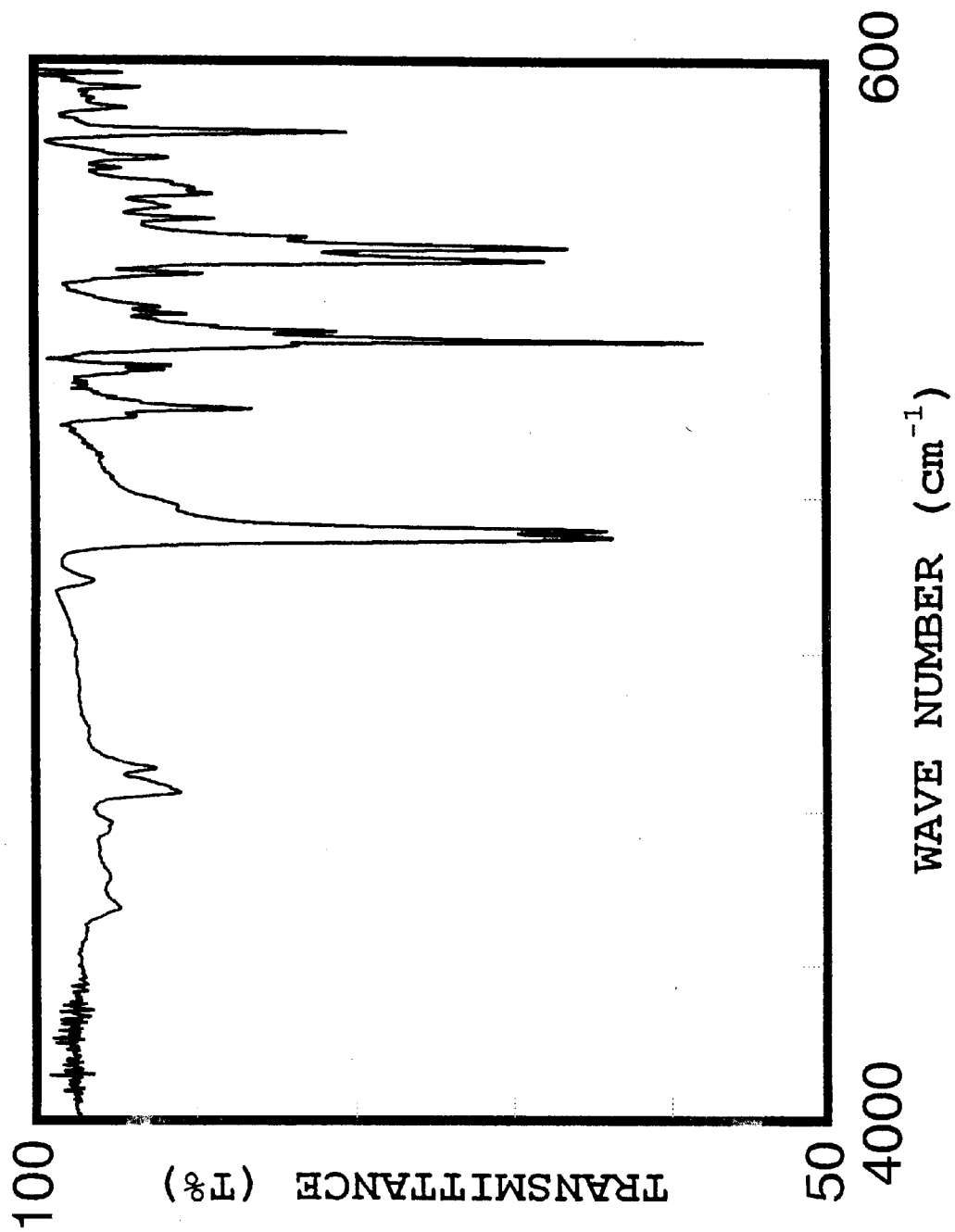
FIG. 1 shows an infrared absorption spectrum of an aromatic polycarbodiimide obtained in Example I-1.

The aromatic polycarbodiimide of the present invention is a novel polymeric compound, which has high solubility in an organic solvent, very high resistance to heat, and a low elastic modulus, and is excellent in adhesion, low temperature workability, and humidity resistance. Furthermore, the aromatic polycarbodiimide easily dissolves in an organic solvent to give a polycarbodiimide solution, can form a polycarbodiimide sheet, and is excellent particularly as an electric wire coating material.

The aromatic polycarbodiimide of the present invention has a structural unit represented by the following formula (I):

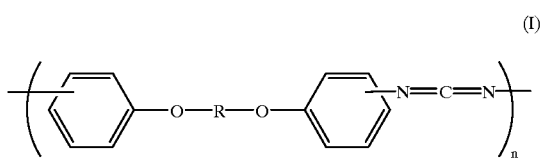

where R is an organic group having 3 or more carbon atoms, and n is an integer of 2 to 300.

The aromatic polycarbodiimide of the present invention is such that in the formula (I), the degree of polymerization, n, is an integer of 2 to 300, preferably an integer of 2 to 100, more preferably an integer of 4 to 50. If n of the polycarbodiimide is greater than 100, the polycarbodiimide easily gels in several minutes to several hours when allowed to stand at room temperature. Thus, the polycarbodiimide having n in excess of 100 is not preferred in handling when used to coat an electric wire, for example. However, when the gelled form is preferably used, the polycarbodiimide having n larger than 100 is desired. Hence, the degree of polymerization n is selected, as desired, according to uses.

In connection with the polycarbodiimide of the present invention, a diisocyanate represented by the following formula (II):

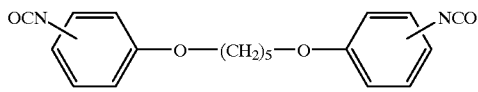

is publicly known (Journal of Polym. Sci., Part A, 28, 7, 1681(1990)). However, there have been no reports that such a diisocyanate was polymerized, or that a polycarbodiimide was obtained from the diisocyanate.

A diisocyanate represented by the following formula (II'):

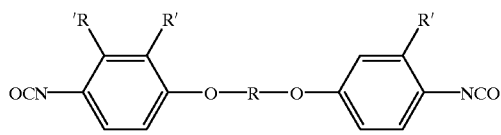

where $R_1$ is a divalent saturated aliphatic hydrocarbon group having 2 to 6 carbon atoms, and having at least 2 carbon atoms between 2 ether oxygen atoms, and $R_1'$ is a hydrogen atom or a methyl group, with the proviso that $R_1'$ is the same on both rings, is also publicly known (Japanese Patent Publication No. Hei 6-25101). However, this diisocyanate is merely described as a monomer for polyurethane, and there have been no descriptions or suggestions that a polycarbodiimide was synthesized from the diisocyanate.

As a polymer concerned with the present invention, a polycarbodiimide represented by the general formula (III):

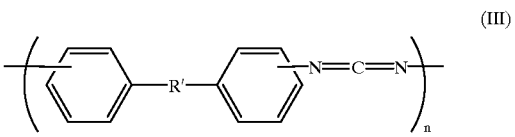

where $R_2'$ is —O— or —$CH_2$—, is publicly known (Japanese Patent Application Laid-Open No. Hei 2-292316, Japanese Patent Application Laid-Open No. Hei 3-62814, Japanese Patent Application Laid-Open No. Hei 4-279618, and Japanese Patent Application Laid-Open No. Hei 6-298890). Such a polycarbodiimide is poor in heat resistance, and when heat-treated at 200° C. or higher, it becomes brittle, and loses self-supporting properties. By contrast, the polycarbodiimide of the present invention is excellent in flexibility, probably because it has at least 3 carbon atoms between the benzene rings via an ether linkage; for example, it contains an organic group such as an alkylene group.

Polycarbodiimide, Polycarbodiimide Solution

The aromatic polycarbodiimide of the present invention is obtained by using a diisocyanate represented by the following formula (IV)

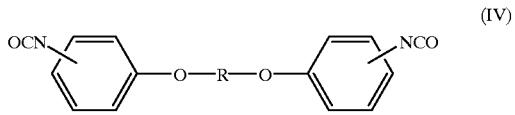

where R is an organic group having 3 or more carbon atoms, as a monomer, and polymerizing the diisocyanate in the presence of a phosphorus-based catalyst in accordance with a publicly known polymerization method.

In the above formula, R is an organic group having 3 or more carbon atoms. As the organic group, an alkylene group or an alkylidene group is preferred, and a straight-chain or branched alkylene group having 3 to 20 carbon atoms is particularly preferred. Examples of the alkylene group are a trimethylene group, a tetramethylene group, a pentamethylene group, a hexamethylene group, a heptamethylene group, an octamethylene group, a nonamethylene group, a decamethylene group, an undecamethylene group, a dodecamethylene group, and their structural isomers having a branched structure. Of them, alkylene groups having 5 to 10 carbon atoms, such as a pentamethylene group, a 2,2-dimethyltrimethylene group, a hexamethylene group, an octamethylene group, a nonamethylene group, and a decamethylene group, are preferred. When R has 3 or more carbon atoms, the flexibility and solubility of the aromatic polycarbodiimide can be improved. If R has more than 20 carbon atoms, the aromatic polycarbodiimide resembles polyethylene, and may decrease in heat resistance or increase in moisture absorption. Thus, preferred examples of the diisocyanate monomer as the raw material for the polycarbodiimide of the present invention are as follows:

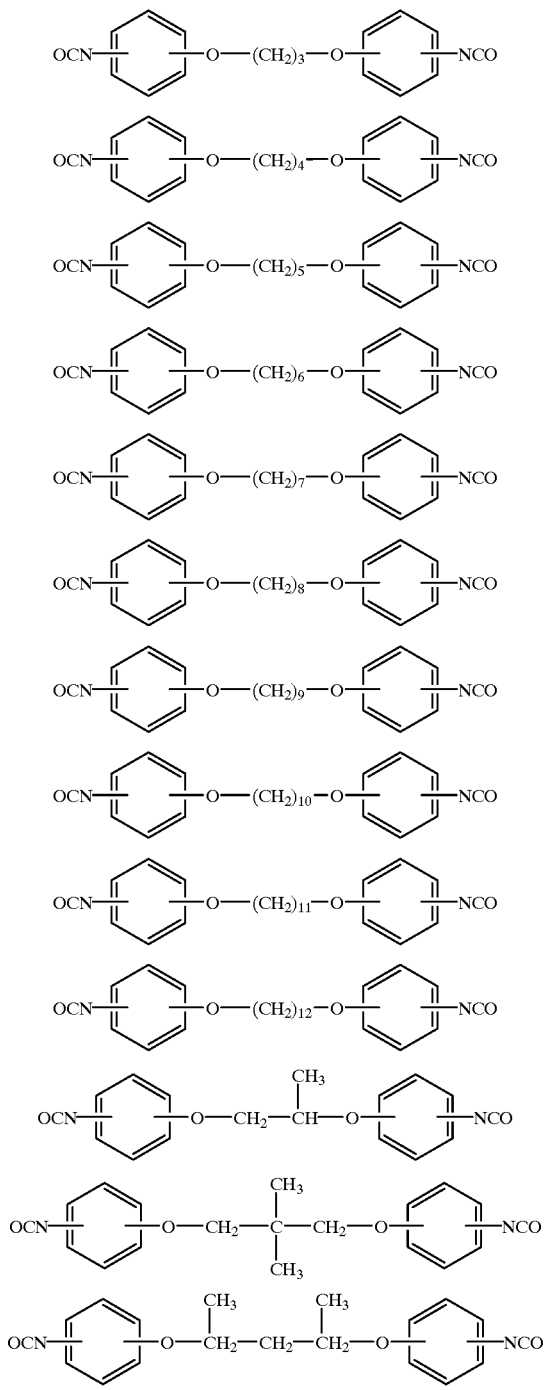

Preparation of Polycarbodiimide from Diisocyanate

To prepare the aromatic polycarbodiimide of the present invention, a diisocyanate monomer represented by the formula (IV) may be used alone, or may be copolymerized with other organic diisocyanate, such as 4,4'-diphenylmethane diisocyanate, 2,6-tolylene diisocyanate, 2,4-tolylene diisocyanate, 1-methoxyphenyl-2,4-diisocyanate, 3,3'-dimethoxy-4,4'-diphenylmethane diisocyanate, 4,4'-diphenylether diisocyanate, 3,3'-dimethyl-4,4'-diphenylether diisocyanate, 2,2-bis[4-(4-isocyanatophenoxy)phenyl]hexafluoropropane, or 2,2-bis[4-(4-isocyanatophenoxy)phenyl]propane, unless the characteristics of the aromatic polycarbodiimide of the present invention are impaired.

The proportion of the organic diisocyanate copolymerized is 1 to 90 mol %, preferably 1 to 70 mol %, based on the diisocyanate monomer represented by the formula (IV). If the copolymerization proportion exceeds 90 mol %, the characteristics of the polycarbodiimide of the present invention may be lost. Other polycarbodiimide may be mixed in a ratio of 1/100 to 100/1 to the aromatic polycarbodiimide of the present invention.

The polymerization temperature is preferably 40 to 150° C., more preferably 50 to 140° C. If the polymerization temperature is lower than 40° C., the reaction time becomes too long, which is not practical. The polymerization temperature of higher than 150° C. makes it difficult to select a suitable solvent.

The concentration of the diisocyanate monomer for the synthesis of a polycarbodiimide is 5 to 70 wt. %, preferably 10 to 60 wt. %. If the monomer concentration is lower than 5 wt. %, carbodiimidization may not proceed. If the monomer concentration exceeds 70 wt. %, it may be difficult to control the reaction.

The organic solvent used for the synthesis of a polycarbodiimide and the organic solvent used in a polycarbodiimide solution may be a publicly known solvent. Examples of the solvent include halogenated hydrocarbons such as tetrachloroethylene, 1,2-dichloroethane, chloroform and dichloromethane; ketone-based solvents such as acetone, methyl ethyl ketone, methyl isobutyl ketone and cyclohexanone; cyclic ether-based solvents such as tetrahydrofuran and dioxane; and aromatic hydrocarbon-based solvents such as toluene, xylene and ethylbenzene. They may be used alone or as a mixture of two or more.

Any publicly known phosphorus-based catalyst is preferably used as the catalyst used for the carbodiimidization, and its examples include phospholene oxides such as 1-phenyl-2-phospholene -1-oxide, 3-methyl-2-phospholene-1-oxide, 1-ethyl-2-phospholene-1-oxide, 3-methyl-1-phenyl-2-phospholene-1-oxide, and 3-phospholene isomers thereof.

At the end stage, middle stage or initial stage of a polymerization reaction of the diisocyanate to form the polycarbodiimide, or throughout the polymerization reaction, a monoisocyanate may be added to carry out an end-capping treatment. Examples of the monoisocyanate include phenyl isocyanate, p-nitrophenyl isocyanate, p-tolyl isocyanate, p-chlorophenyl isocyanate, p-methoxyphenyl isocyanate, p-formylphenyl isocyanate, p-isopropylphenyl isocyanate, and position isomers having a substituent at the ortho- or meta-positions thereof, 1-naphthyl isocyanate, 2-naphthyl isocyanate, dimethylphenyl isocyanate, and diisopropylphenyl isocyanate. A polycarbodiimide solution prepared from the thus obtained polycarbodiimide has excellent storage stability.

After completion of the reaction, the reaction mixture may be poured into a poor solvent such as methanol, ethanol, hexane, heptane pentane or isopropyl alcohol to deposit a polycarbodiimide as a precipitate and remove the unreacted monomer and the catalyst.

To prepare a polycarbodiimide solution, the aromatic polycarbodiimide of the present invention deposited as a precipitate is washed and dried by a predetermined operation, and dissolved in an organic solvent again. The storage stability of the polycarbodiimide solution can be improved by performing this operation.

The resulting polymer may be purified by adsorbing a by-product or the unreacted matter contained in the polymer solution to a suitable adsorbent. Examples of the adsorbent include alumina gel, silica gel, activated carbon, zeolite, active magnesium oxide, active bauxite, fuller's earth, activated china clay, and molecular sieving carbon. They may be used alone or in combination.

Preparation of Diisocyanate from Diamine

Another method of preparing the aromatic polycarbodiimide of the present invention may be to convert an aromatic diamine represented by the following formula (V);

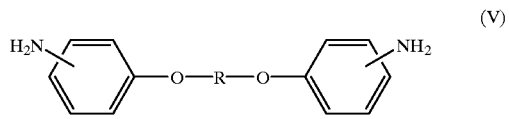

(V)

where R is an organic group having 3 or more carbon atoms,
into a diisocyanate by a publicly known diisocyanation method, and polymerize the diisocyanate as a monomer.

A method for the diisocyanation of diamine is, for example, to react phosgene, diphenyl carbonate or carbonyl diimidazole with a diamine. An alternative method is one in which a diamine compound is converted into a dicarbamate with the use of a halogenated alkyl formate or halogenated aryl formate, and the dicarbamate is then diisocyanated using chlorosilane as a catalyst (G. Greber. et al., Angew. Chem. Int. Ed., Vol. 17, No. 12, 941 (1968)) or using catechol borane (V. L. K. Valli. et al., J. Org. Chem., Vol. 60, 257 (1995)). The latter method is preferred in terms of yield and safety. The latter method, which produces a diisocyanate from a diamine via a dicarbamate, will be described below.

Method of Producing Diisocyanate from Diamine Via Dicarbamate

Production of Dicarbamate from Diamine

First, a dicarbamate is synthesized by reacting methyl chloroformate, ethyl chloroformate, phenyl chloroformate or p-nitrophenyl chloroformate with a corresponding diamine compound. These chloroformates may be used alone or as a mixture of two or more. Of these chloroformates, phenyl chloroformate or p-nitrophenyl chloroformate is suitable for diisocyanation using a chlorosilane to be described later on.

Any solvent may be used in the reaction, if it dissolves a diamine. Examples of the solvent include ether-based compounds such as THF, dioxane and diethyl ether; aromatic hydrocarbon-based compounds such as toluene, xylene and benzene; ketone-based compounds such as acetone, and methyl ethyl ketone; and ester-based compounds such as ethyl acetate. These solvents may be used alone or as a mixture of two or more.

The reaction temperature is −40 to 100° C., preferably −20 to 60° C. If the reaction temperature is lower than −40° C., the reaction time becomes too long, which is not practical. If the reaction temperature is higher than 100° C., the resulting dicarbamate may be decomposed.

Any base for trapping hydrogen chloride formed by the reaction is acceptable, if it dissolves in the solvent used and does not inhibit the reaction. Examples of the base include triethylamine, sodium hydroxide, pyridine, and 1,8-diazabicyclo[5.4.0]-7-undecene.

A conventionally known method, such as recrystallization or column chromatography, can be used to purify the resulting dicarbamate. Distillation may be carried out as required.

Diisocyanation of Dicarbamate (a) Diisocyanation using chlorosilane

Diisocyanation of the dicarbamate with a chlorosilane is carried out by thermally decomposing the dicarbamate using the chlorosilane as an activation reagent in an amount of 1.5 to 4.6 times, preferably 1.7 to 3.0 times, the number of moles of the dicarbamate. If the amount of the chlorosilane is less than 1.5 times, the reaction may not proceed completely. If the amount is larger than 4.6 times, polymerization may proceed excessively to make the molecular weight too high, when isocyanation and the polymerization are performed continuously in the same reactor. Also, it may be difficult to remove the unreacted matter. Examples of the chlorosilanes include trimethylchlorosilane, dimethyldichlorosilane, methyltrichlorosilane, triethylchlorosilane, trimethoxychlorosilane, and tetrachlorosilane. Of them, trimethylchlorosilane is preferred because of economy and ease of handling.

Any solvent may be used, if it dissolves or suspends the dicarbamate. Examples of the solvent include the aforementioned ether-based compounds, aromatic hydrocarbons, and halogenated hydrocarbons.

The reaction temperature is 0° C. to the boiling point of the solvent used. To trap hydrogen chloride formed during the reaction, the base such as triethylamine may be used in the same manner. The amount of the base is 1.5 to 4.6 times, preferably 1.7 to 3.0 times, the number of moles of the dicarbamate. If the amount of the base is smaller than 1.5 times, the reaction may not proceed completely. If the amount is larger than 4.6 times, removal of the unreacted matter may be difficult.

(b) Diisocyanation using halogenated catechol borane

Diisocyanation of the dicarbamate may be carried out using a halogenated catechol borane instead of the chlorosilane as the catalyst. Examples of the halogenated catechol borane include chlorocatechol borane and bromocatechol borane. The solvent used in this reaction may be the same as that used in the diisocyanation using the chlorosilane. The reaction temperature is generally −50 to 80° C., preferably −20 to 70° C. To trap hydrogen chloride formed during the reaction, the same base as exemplified earlier, such as triethylamine, may be used.

The resulting diisocyanate monomer can be purified in the customary manner after the reaction and after removing the solvent. The diisocyanate so prepared from diamine is polymerized with the use of a publicly known carbodiimidization catalyst as stated above to obtain a polycarbodiimide. The carbamation of diamine, diisocyanation, and carbodiimidization may be performed stepwise, with isolation and purification being carried out at the respective steps. Alternatively, these steps may be performed continuously as a series of reactions in a single reactor, as described in Japanese Patent Application Laid-Open No. Hei 10-158394.

(Insulated Coated Electric Wire)

To prepare an electric wire coating varnish for use in an insulated coated electric wire, the viscosity of the aromatic polycarbodiimide according to the present invention is adjusted using an organic solvent. Any organic solvent may be used, if it dissolves the aromatic polycarbodiimide. Examples of the organic solvent include ether-based solvents such as tetrahydrofuran, diethyl ether, and dioxane; ester-based compounds such as ethyl acetate; hydrocarbon-based compounds such as toluene, xylene and benzene; and halogenated hydrocarbon-based compounds such as chloroform, and methylene chloride. It is preferred to use hydrocarbon-based solvents, such as toluene and xylene, alone or as a mixture of two or more from the viewpoints of coating properties, safety and economy.

The polycarbodiimide concentration in the electric wire coating varnish is 1 to 70 wt. %, preferably 10 to 50 wt. %. The concentration of less than 1 wt. % is not preferred, because a film thickness necessary for ensuring electrical insulation properties cannot be secured. The concentration in excess of 70 wt. % results in a high viscosity of the solution, which is not preferred for coating of an ultrafine wire. The insulated coated electric wire of the present invention is obtained by coating the electric wire coating varnish onto a bare wire, such as a copper wire or a tinned wire, followed by drying, to remove the organic solvent. The coating temperature is 500° C. or lower, and gradual heating to this temperature can result in an insulated coated electric wire. However, the solvent may be dried beforehand at a low temperature, and then heat treatment may be performed.

The heat treatment temperature needs to be 500° C. or lower. Heat treatment at a temperature higher than 500° C. causes thermal decomposition of the polycarbodiimide, and deteriorates the resulting film. When the heat treatment temperature is 250° C., the heat treatment is preferably performed for 2 to 10 minutes. At 400° C., the heat treatment time is preferably 1 to 5 minutes. Too short a heat treatment time is not preferred, because the resulting film is not uniform. A too long heat treatment time results in low productivity, which is not preferred.

In the present invention, other resins, organic compounds and inorganic compounds may be incorporated, or jointly used as reactants, in order to improve the characteristics of the electric insulation film, such as heat resistance, mechanical properties, electrical properties, adhesion, slip properties, and processability. Examples of these additional materials include organic compounds such as polyamide compounds, silicone compounds, fluorine compounds, polyisocyanate compounds, isocyanurate compounds, polyolefins, polyimide compounds, polyurethane compounds, nadiimide compounds, and carbodiimide compounds; and inorganic compounds such as silicon oxide, titanium oxide, calcium carbonate, and molybdenum disulfide. These organic or inorganic compounds can be used jointly, as long as they do not impede the object of the invention.

(Production of Film and Adhesive Sheet)

The polycarbodiimide film (or sheet) of the present invention is obtained by forming a polycarbodiimide varnish into a film having an appropriate thickness in accordance with a publicly known method (such as casting, spin coating, or roll coating). This film may be dried usually at a temperature required to remove the solvent. In order to dry the film without proceeding with a curing reaction considerably, the coating temperature is, for example, 20 to 350° C., preferably 50 to 250° C. If the drying temperature is lower than 20° C., the solvent remains in the film, resulting in poor reliability of the resulting film, which is not preferred. At the drying temperature of higher than 350° C., heat curing of the film proceeds, making the film brittle.

The polycarbodiimide resin composition of the present invention may contain a fine inorganic filler in an amount within a range where its workability and heat resistance are not impaired. Various additives, such as a smoothing agent, a leveling agent, and a defoaming agent, may be added, as required, to impart surface smoothness.

A film-shaped formed product prepared from the aromatic polycarbodiimide of the present invention can be used as a heat resistant adhesive sheet. Thickness of the sheet is generally, but not limited to, 1 to 200 µm, and can be selected, as desired, according to the purpose. The shape and size of the sheet can be determined, as desired, according to an adherend such as a lead frame or a semiconductor chip.

When an adhesive sheet is to be produced, one or more of metals such as aluminum, copper, silver, gold, nickel, chromium, lead, tin, zinc, palladium and solder, or alloys thereof, ceramics such as alumina, silica, magnesia and silicon nitride, and various inorganic powders comprising carbon, etc. may be blended, as desired, to impart electrical conductivity, improve heat conductivity, and control elastic modulus, especially to increase elastic modulus.

Further, the film may be formed on a substrate to produce an adhesive sheet. To produce such an adhesive sheet, the substrate may be coated with a varnish of polycarbodiimide, or a film may be formed and laminated to a substrate by pressing.

The substrate used herein is, for example, a metal foil or an insulating film. The metal foil may be a foil of aluminum, copper, silver, gold, nickel, indium, chromium, lead, tin, zinc, or palladium. These metals may be used alone or as an alloy. Any film of a polyimide, polyester or polyethylene terephthalate may be used as the insulating film, if it has heat resistance and chemical resistance.

The metal foil and the insulating film may be used alone, or as a laminate of two or more layers, for example, a two-layer substrate such as a metal foil/insulating film. Such a two-layer substrate is, for example, a copper/polyimide two-layer substrate.

The adhesive sheet prepared from the aromatic polycarbodiimide of the present invention is thermally cured by heat treatment to exhibit a strong adhesive force and become a cured product having low hygroscopicity. To carry out the heat treatment, a suitable means such as a heater, ultrasonic wave or ultraviolet radiation may be used. Therefore, the adhesive sheet of the present invention is preferably used in the adhesion treatment of various materials. Particularly, the adhesive sheet of the present invention is preferably used in the fixing treatment of electric and electronic parts typified by semiconductor chips and lead frames, which require highly reliable fixing treatment and thus must have low hygroscopicity. The adhesive sheet of the present invention is excellent in such points as low hygroscopicity, high flexibility resulting in easy handling, satisfactory adhesion to a semiconductor device, high storage stability, and a low dielectric constant.

EXAMPLES

The aromatic polycarbodiimide of the present invention can also be used as an adhesive for electronic parts, because of its heat resistance.

[Examples]

The present invention will now be described further concretely by way of Examples and Comparative Examples. All the reactions were carried out in a stream of nitrogen. The diamines used as a starting material were obtained from Wakayama Seika Kogyo Co., Ltd. The characteristics of the resulting polycarbodiimides were measured as follows:

IR

Measured using an infrared spectrophotometer (trade name: FT/IR-230, manufactured by JEOL Ltd.).

Elastic Modulus (E')

Measured at room temperature using a dynamic viscoelasticity measuring apparatus (trade name: DMS210, manufactured by Seiko Instruments, Inc.).

Glass Transition Temperature (Tg)

Measured using a thermomechanical analyzer (trade name: TMA/SS100, manufactured by Seiko Instruments, Inc.).

Heat Curing Temperature (Tc)

Measured using a differential scanning calorimeter (trade name: DSC-200, manufactured by Seiko Instruments, Inc.), and the exothermic peak of trimerization is taken as heat curing temperature.

Number Average Molecular Weight

Measured using a gel permeation chromatograph (trade name: HCL8120, manufactured by Tosoh Corporation), a column (trade name: $GMH_{HR-H}+GMH_{HR-H}+G2000H_{HR}$, manufactured by Tosoh Corporation), tetrahydrofuran as a developing solvent, and polystyrene as a standard sample.

Adhesive Strength

Adhesive Shear Strength

A copper/polycarbodiimide resin two-layer adhesive sheet was prepared, and cut to a size of 4 cm×4 cm. A chip formed by dicing a wafer with a polyimide passivation film to a size of 3 mm×3 mm was thermally pressure bonded to the cut adhesive sheet at 300° C.×0.33 kgf/mm²×60 sec with the use of a flip chip bonder (trade name: DB100, manufactured by SHIBUYA KOGYO CO., LTD.). The adhesive shear strength was measured at a room temperature of 23° C. using a load measuring apparatus (manufactured by AIKOH ENGINEERING).

Peel Strength (Delamination Strength)

A 180° peeling test was conducted by grasping a copper foil of an adhesive sheet and a 42 alloy plate, and separating them at room temperature using a tensile tester (trade name: Shimadzu Autograph AGS-100, manufactured by Shimadzu Corporation) to measure delamination strength (peel strength at 180°).

Varnish Viscosity

Viscosity at 25° C. and 20 rpm was measured using an E type viscometer (a cone plate type rotational viscometer, VISCONIC ED, manufactured by TOKIMEC).

Storage Stability of Varnish

Expressed as the number of days during which neither gelling of varnish nor increase in viscosity (thickening) occurs when the varnish is allowed to stand at room temperature.

[Example I-1]

1,5-Bis(4-aminophenoxy)pentane (20.8 g, 72.6 mmol), triethylamine (14.9 g, 147.2 mmol), 129.2 g of toluene, and 86.1 g of tetrahydrofuran were charged into a four-necked flask equipped with a stirrer, a dropping funnel, a reflux condenser and a thermometer. The flask was cooled in an iced bath, and phenyl chloroformate (23.0 g, 146.9 mmol) was added dropwise over 0.1 minute from the dropping funnel. Then, the mixture was stirred at room temperature for 120 minutes.

After the formation of a carbamate was confirmed by IR, trimethylchlorosilane (14.3 g, 131.7 mmol), triethylamine (13.4 g, 132.4 mmol), and a carbodiimidization catalyst (3-methyl-1-phenyl-2-phospholene-1-oxide) (0.70 g, 3.6 mmol) were charged, and stirred at 60° C. for 1 hour and then at 85° C. for 8 hours to carry out isocyanation and polymerization.

Carbodiimidization was confirmed by an IR spectrum shown in FIG. 1, and the triethylamine hydrochloride formed was removed by filtration to obtain a varnish. The number average molecular weight (Mn) of this aromatic polycarbodiimide was 2,430 (n=8). The storage stability of the varnish was 10 days or more.

[Example I-2]

Carbamate formation, isocyanation and polymerization were performed in the same manner as in Example I-1, except that 2,2-dimethyl-1,3-bis(4-aminophenoxy)propane (20.8 g, 72.6 mmol) was used instead of 1,5-bis(4-aminophenoxy)pentane (20.8 g, 72.6 mmol).

Figure 2:
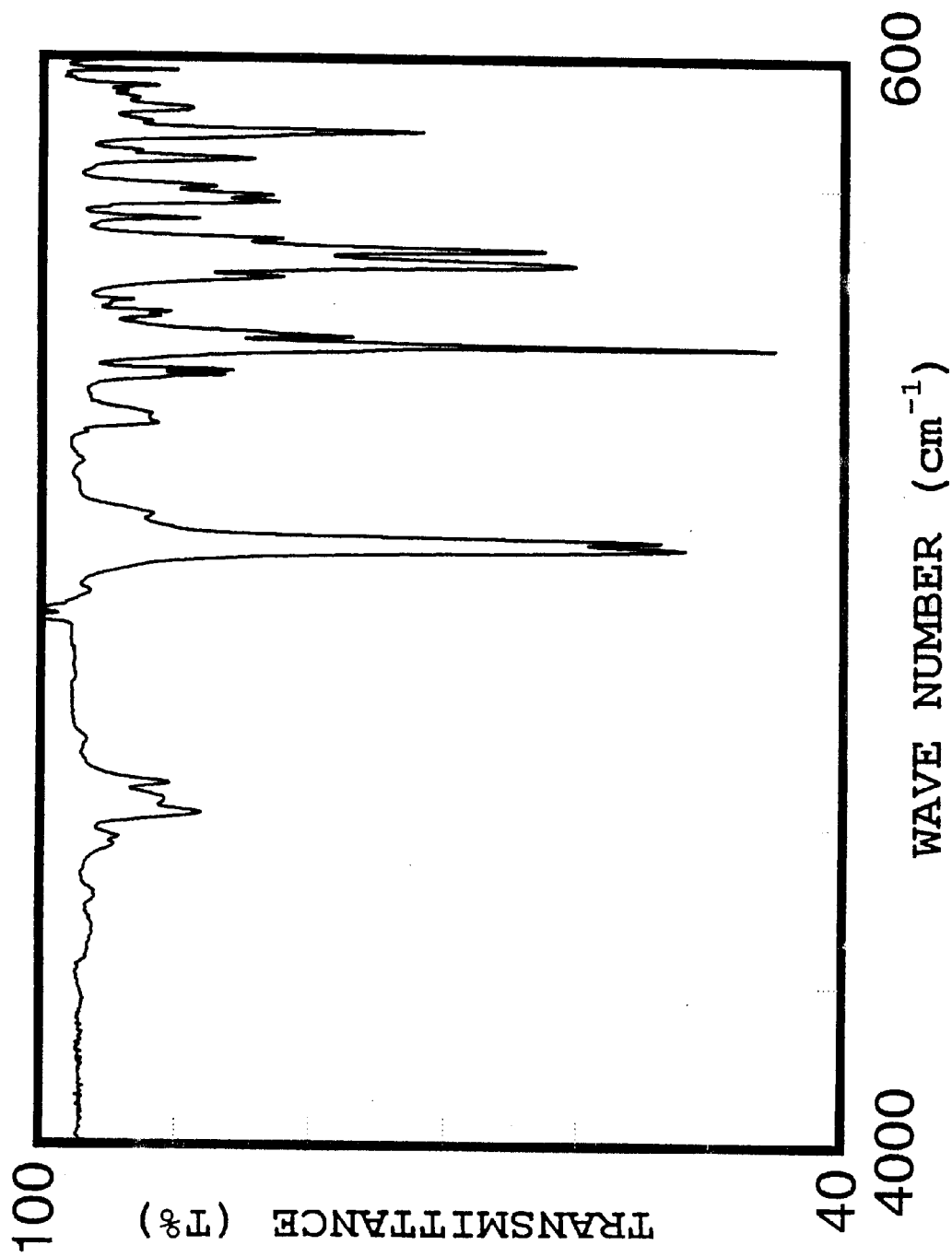
FIG. 2 shows an infrared absorption spectrum of an aromatic polycarbodiimide obtained in Example I-2.

Carbodiimidization was confirmed by an IR spectrum shown in FIG. 2, and the triethylamine hydrochloride formed was removed by filtration to obtain a varnish. The number average molecular weight (Mn) of this aromatic polycarbodiimide was 2,680 (n=9). The storage stability of the varnish was 30 days or more.

[Example I-3]

1,5-Bis(4-aminophenoxy)pentane (66.0 g, 230.5 mmol), triethylamine (46.6 g, 460.5 mmol), trimethylchlorosilane (50.1 g, 461.3 mmol), and 664.5 g of toluene were charged into the same four-necked flask as in Example I-1, and stirred at 80° C. for 3 hours.

The flask was cooled in an iced bath, and phenyl chloroformate (72.2 g, 461.1 mmol) was added dropwise over 30 minutes with stirring. Then, the mixture was stirred overnight at room temperature.

Then, triethylamine (56.0 g, 553.4 mmol), trimethylchlorosilane (10.0 g, 92.1 mmol), and a carbodiimidization catalyst (3-methyl-1-phenyl-2-phospholene-1-oxide) (2.2 g, 11.4 mmol) were charged, and stirred at 80° C. for 4 hours to carry out isocyanation and polymerization. The reaction mixture was cooled to room temperature, and 4-isopropylphenyl isocyanate (8.6 g, 53.3 mmol) was added, followed by reacting the mixture for 3 hours at 100° C.

Figure 3:
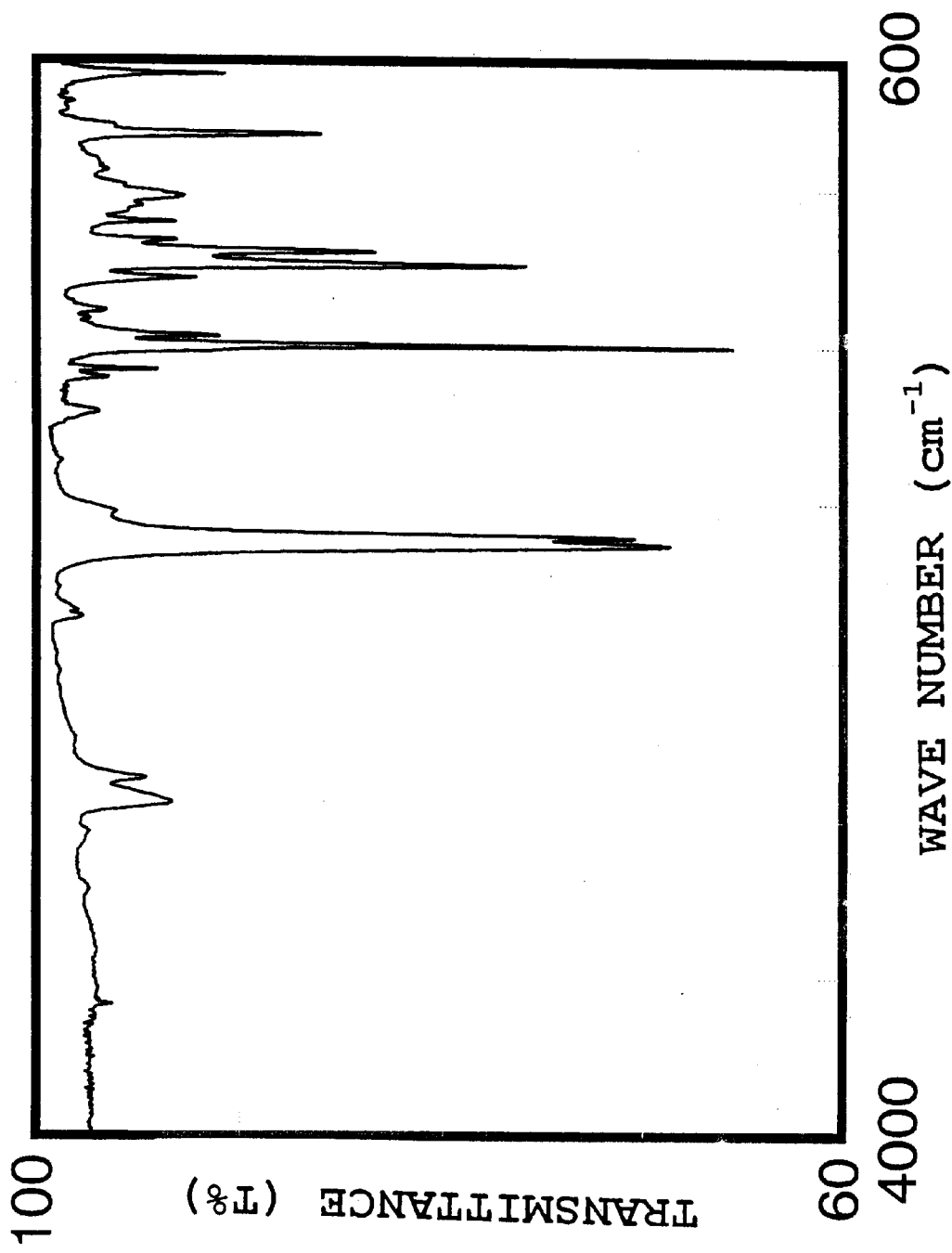
FIG. 3 shows an infrared absorption spectrum of an aromatic polycarbodiimide obtained in Example I-3.

Carbodiimidization was confirmed by an IR spectrum shown in FIG. 3. The triethylamine hydrochloride formed was removed by filtration to obtain a brown varnish. The storage stability of this varnish was 7 days or more at room temperature.

The resulting varnish was added into n-hexane with stirring. A precipitated polymer was collected, and dried to obtain 42.25 g of an aromatic polycarbodiimide as a light brown powder (yield: 62%). The resulting aromatic polycarbodiimide had Mn=4810 (n=16).

[Example I-4]

2,2-Dimethyl-1,3-bis(4-aminophenoxy)propane (20.0 g, 69.8 mmol), triethylamine (14.1 g, 139.3 mmol), trimethylchlorosilane (15.2 g, 140.0 mmol), and 151.6 g of toluene were charged into the same four-necked flask as in Example I-1, and stirred at 80° C. for 3 hours.

The flask was cooled in an iced bath, and phenyl chloroformate (21.9 g, 139.9 mmol) was added dropwise over 0.5 hour with stirring. Then, the mixture was stirred overnight at room temperature.

Then, triethylamine (17.0 g, 168.0 mmol), and trimethylchlorosilane (3.0 g, 27.6 mmol) were charged, and the mixture was stirred at 80° C. for 3 hours and then at 90° C. for 2 hours to carry out isocyanation. The reaction solution was cooled to room temperature, and a carbodiimidization catalyst (3-methyl-1-phenyl-2-phospholene-1-oxide) (0.67 g, 3.5 mmol) and 1-naphthyl isocyanate (2.7 g, 16.0 mmol) were added, followed by stirring the mixture for 4 hours at 90° C. to perform polymerization.

Figure 4:
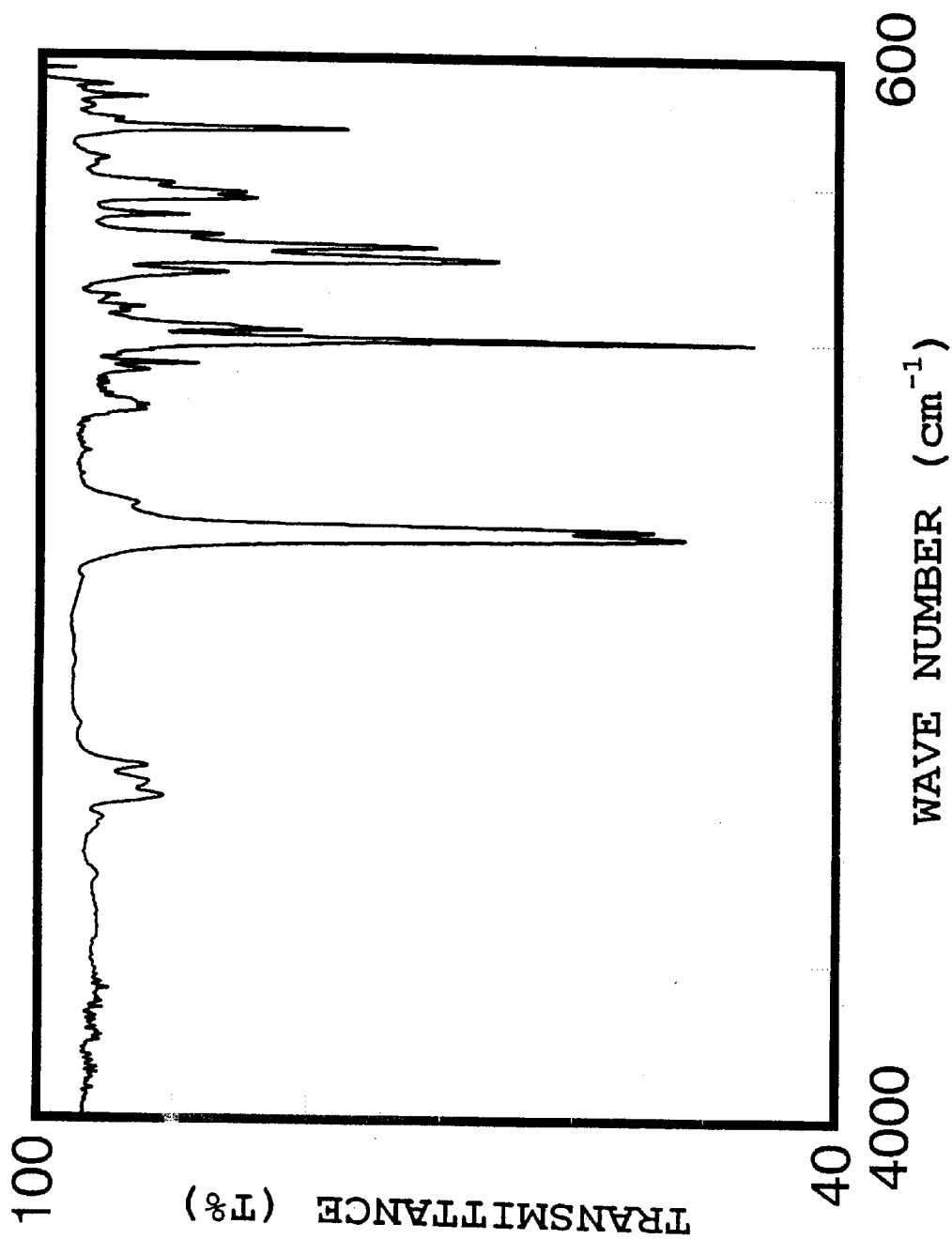
FIG. 4 shows an infrared absorption spectrum of an aromatic polycarbodiimide obtained in Example I-4.

Carbodiimidization was confirmed by an IR spectrum shown in FIG. 4. The triethylamine hydrochloride formed was removed by filtration to obtain a brown varnish. The storage stability of this varnish was 7 days or more.

The resulting varnish was added into n-heptane with stirring. A precipitated polymer was collected, and dried to obtain 12 g of an aromatic polycarbodiimide as a light brown powder (yield: 60%). The resulting aromatic polycarbodiimide had Mn=3500 (n=12).

[Example I-5]

Polymerization was performed in the same manner as in Example I-3, except that instead of 1,5-bis(4-aminophenoxy)pentane, an equimolar amount of 1,6-bis(4-aminophenoxy)hexane (230.5 mmol) was used as a monomer.

Figure 5:
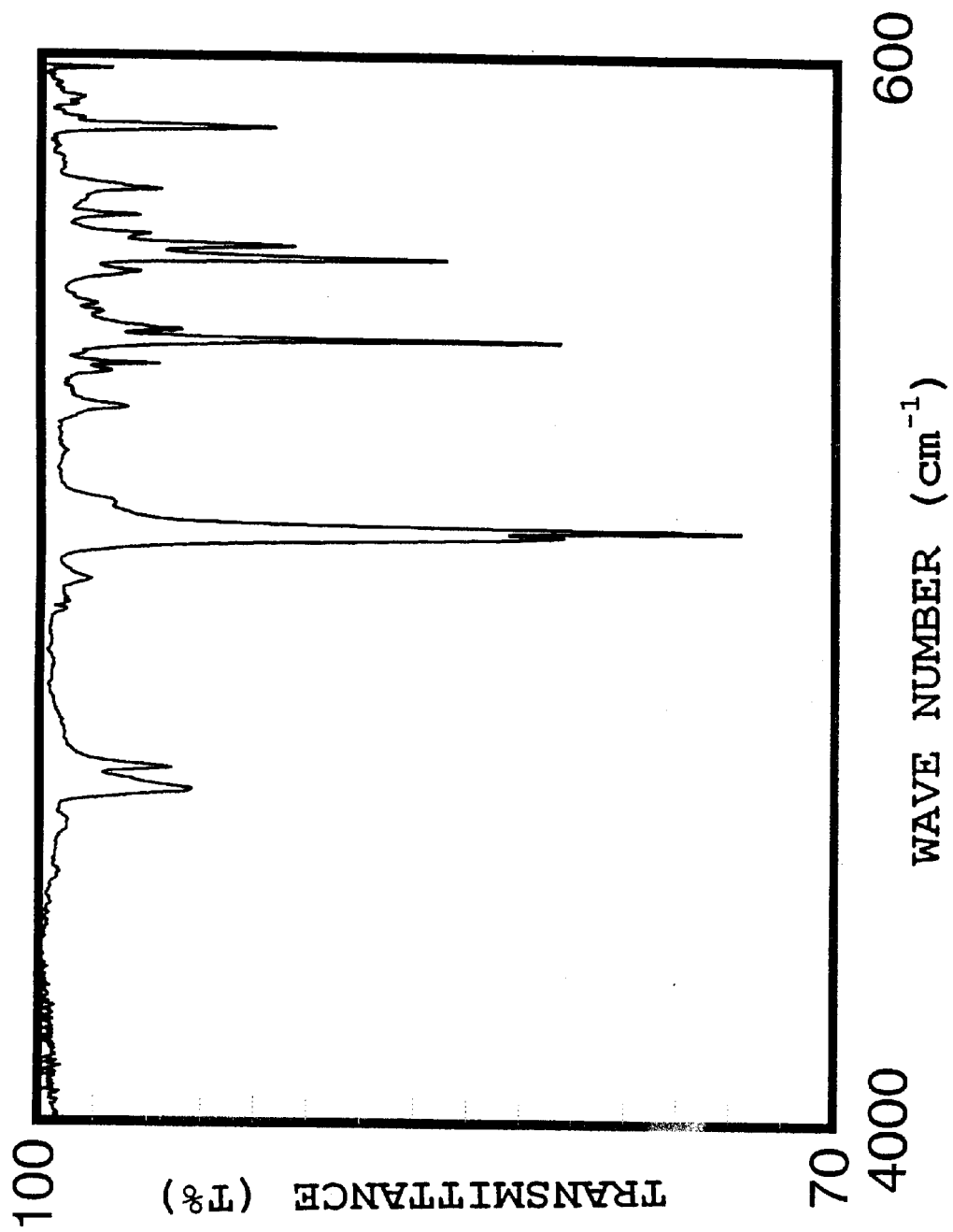
FIG. 5 shows an infrared absorption spectrum of an aromatic polycarbodiimide obtained in Example I-5.

Carbodiimidization was confirmed by an IR spectrum shown in FIG. 5, and the triethylamine hydrochloride formed was removed to obtain a varnish. The storage stability of the varnish was 7 days or more. The number average molecular weight (Mn) of the resulting aromatic polycarbodiimide was 2,700 (n=9).

[Example I-6]

Polymerization was performed in the same manner as in Example I-3, except that instead of 1,5-bis(4-aminophenoxy)pentane, an equimolar amount of 1,8-bis(4-aminophenoxy)octane (230.5 mmol) was used as a monomer.

Figure 6:
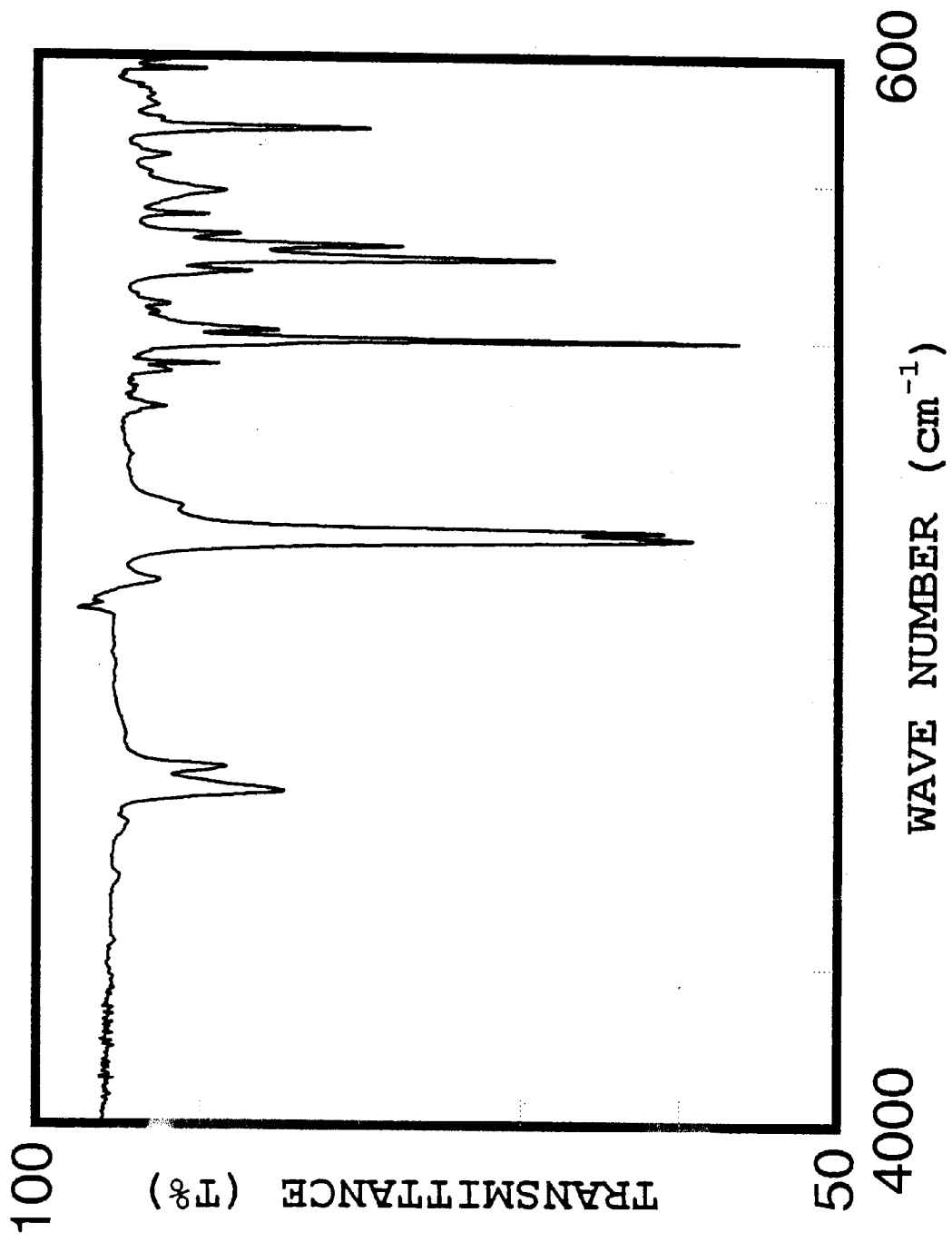
FIG. 6 shows an infrared absorption spectrum of an aromatic polycarbodiimide obtained in Example I-6.

Carbodiimidization was confirmed by an IR spectrum shown in FIG. 6, and the triethylamine hydrochloride formed was removed to obtain a varnish. The storage stability of the resulting varnish was 7 days or more. The number average molecular weight (Mn) of the resulting aromatic polycarbodiimide was 5,800 (n=18).

The above varnish was stable for 7 days or more at room temperature.

[Example I-7]

Isocyanation of 2,2-dimethyl-1,3-bis(4-aminophenoxy)propane was performed by the phosgene method to obtain 2,2-dimethyl-1,3-bis(4-isocyanatophenoxy)propane.

The resulting 2,2-dimethyl-1,3-bis(4-isocyanatophenoxy)propane (37.6 g, 111.1 mmol), 52.3 g of xylene, a carbodiimidization catalyst (3-methyl-1-phenyl-2-phospholene-1-oxide) (1.07 g, 5.6 mmol) and 1-naphthyl isocyanate (8.65 g, 51.1 mmol) were charged into a flask, and stirred for 2 hours at 80° C. to perform polymerization.

Figure 7:
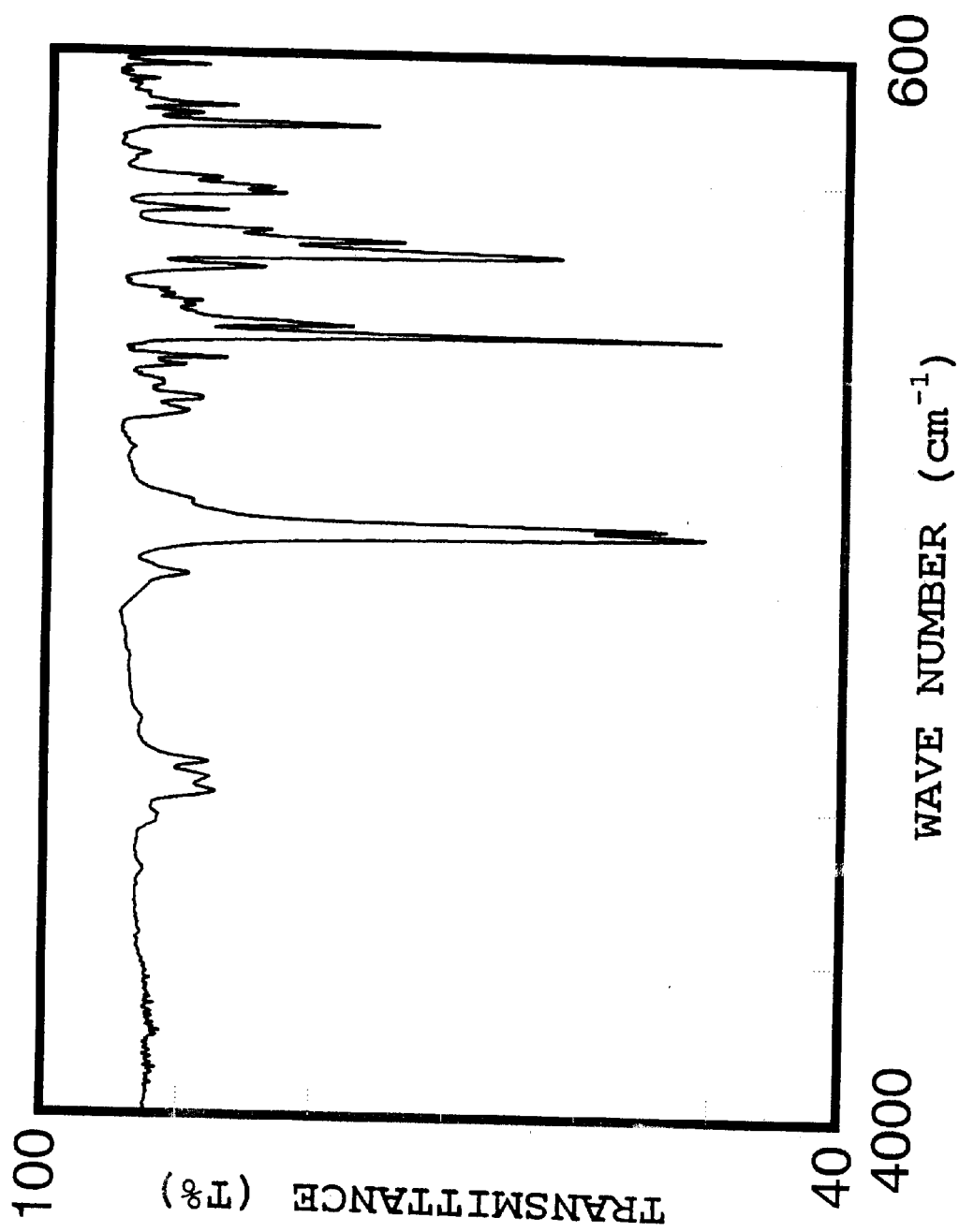
FIG. 7 shows an infrared absorption spectrum of an aromatic polycarbodiimide obtained in Example I-7.

Carbodiimidization was confirmed by an IR spectrum shown in FIG. 7. The storage stability of the resulting varnish was 7 days or more. The number average molecular weight (Mn) of the resulting aromatic polycarbodiimide was 1,860 (n=6).

[Comparative Example 1]

5.0 g (20.0 mmol) of 4,4'-diphenylmethane diisocyanate was stirred in 40 g of tetrahydrofuran together with 30 mg (0.16 mmol) of a carbodiimidization catalyst (3-methyl-1-phenyl-2-phospholene-1-oxide) at 60° C. for 15 hours to obtain a polycarbodiimide solution. The number average molecular weight (Mn) of this aromatic polycarbodiimide was 9,600 (n=37).

The resulting aromatic polycarbodiimide solution was cast onto a glass plate, and dried at 90° C. for 30 minutes to produce a 30 μm thick film. The heat curing temperature of the resulting film was Tc=300° C., and its glass transition temperature was Tg=78° C. The elastic modulus was E'=1.5 GPa.

When this film was further heat treated at 250° C. for 30 minutes, it discolored and lost flexibility.

[Example II]

The varnishes obtained in Examples I-1 to I-7 and Comparative Example 1 were each cast onto a glass plate, and dried at 90° C. for 30 minutes and then at 250° C. for 30 minutes. The thermal properties of the resulting films of 30 μm in thickness were measured.

TABLE 1

|  | Tg (° C.) | E' (GPa) |
| --- | --- | --- |
| Example I-1 | 144 | 1.37 |
| Example I-2 | 183 | 0.96 |
| Example I-3 | 150 | 0.83 |
| Example I-4 | 172 | 2.03 |
| Example I-5 | 110 | 0.38 |
| Example I-6 | 140 | 0.66 |
| Example I-7 | 140 | 1.55 |
| Comparative Example 1 | not measurable (brittle) | |

[Example III]

Powders of the polycarbodiimides obtained in Example I-3, Example I-4 and Comparative Example 1 were each redissolved in cyclohexanone to prepare a 35 wt. % basis varnish. The varnish was coated onto a 105 μm thick copper foil to a thickness after drying of 10 μm. The coated copper foil was dried at 90° C. for 30 minutes and then at 250° C. for 30 minutes to produce a copper/polycarbodiimide two-layer adhesive sheet. The adhesive strength of the adhesive sheet bonded to a chip was measured. The results are shown in Table 2.

TABLE 2

| Polymer of adhesive layer | Tg of adhesive layer (° C.) | Adhesive strength (MPa) |
| --- | --- | --- |
| Example I-3 | 150 | 6.8 |
| Example I-4 | 172 | 8.5 |
| Comparative Example 1 | >200 | <1.0 |

[Example IV-1]

The varnish prepared in Example I-1 was coated onto a 105 μm thick copper foil, and dried at 90° C. for 30 minutes and then at 200° C. for 60 minutes to obtain an adhesive sheet having an adhesive layer thickness of 10 μm. The surface of the adhesive layer of the adhesive sheet was adhered to a 42 Alloy plate (Ni:Fe or other=40.0-43.0:60.0-57.0 alloy plate, trade name: NAS 42, manufactured by Nippon Yakin Kogyo Co., Ltd.). The adhesive sheet and the 42 Alloy plate were pressed at 250° C. and a pressure of 50 kg/cm² for 1 second to prepare a laminate. Measurement showed the peel strength of the sheet to be 1,500 g/cm. A solder temperature resistance test of the adhesive sheet showed satisfactory adhesion. The glass transition temperature of the adhesive layer was 139° C., its elastic modulus at 200° C. was 10 MPa or less, and its water absorption was 0.1%.

[Example IV-2]

The varnish prepared in Example I-2 was coated onto a 105 μm thick copper foil, and dried at 90° C. for 30 minutes and then at 200° C. for 60 minutes to obtain an adhesive sheet having an adhesive layer thickness of 10 μm. The surface of the adhesive layer of the adhesive sheet was adhered to a 42 Alloy plate, and the adhesive sheet and the 42 Alloy plate were pressed at 200° C. and a pressure of 50 kg/cm$^2$ for 1 second to prepare a laminate. The peel strength of the sheet was measured in the same manner as in Example IV-1, showing adhesive strength of 1,200 g/cm. A solder temperature resistance test of the adhesive sheet showed satisfactory adhesion. The glass transition temperature of the adhesive layer was 154° C., its elastic modulus at 200° C. was 10 MPa or less, and its water absorption was 0.1%.

[Example V-1]

100 Parts by weight of the aromatic polycarbodiimide obtained in Example I-1 were dissolved in 300 parts by weight of toluene to obtain an electric wire coating varnish. The viscosity of the electric wire coating varnish was 50 mpa·s.

The resulting electric wire coating varnish was coated 20 times onto a 36 μm copper wire conductor, and cured at 300° C. to obtain an insulated coated electric wire. The properties of the resulting insulated coated electric wire were evaluated in accordance with the testing methods described below. The results are shown in Table 3.

Testing Methods
(1) Measurement of dielectric constant, dielectric loss tangent and volume resistivity The electric wire coating varnish prepared in each of the Examples and Comparative Example was formed into a sheet. Gold was deposited in the form of a disk of 2 cm in diameter on one side of the sheet, and also on the entire surface of the other side of the sheet to form electrode surfaces. Measurements were made of the unchanged state (normal state) and the state after 100 hours of a pressure cooker test to be described below. The dielectric constant and dielectric loss tangent were measured using an LCR meter (trade name: 4284A PRECISION LCR METER, manufactured by Hewlett Packard Co., Ltd.). The volume resistivity was measured with a resistivity meter (trade name: R8340A ULTRAHIGH RESISTANCE METER, manufactured by Advantest).
(2) Appearance (of insulated coated electric wire)

Satisfactory film state of insulated coated electric wire: Marked with "○".

Poor film state of insulated coated electric wire: Marked with "X".
(3) PCT (pressure cooker test):

Conducted at 121° C.×2 atm×100% RH.

[Example V-2]

100 Parts by weight of the polycarbodiimide obtained in Example I-2 were dissolved in 300 parts by weight of toluene to obtain an electric wire coating varnish. The viscosity of the electric wire coating varnish was 45 mpa·s.

The resulting electric wire coating varnish was subjected to the same procedure as in Example V-1 to obtain an insulated coated electric wire. The properties of the insulated coated electric wire are shown in Table 3.

[Comparative Example 2]

An electric wire coating varnish was obtained in the same manner as in Example V-1, except that the polycarbodiimide obtained in Comparative Example 1 was used. The viscosity of the electric wire coating varnish was 40 mpa·s. The resulting electric wire coating varnish was subjected to the same procedure as in Example V-1 to obtain a coated electric wire. The properties of the conductor are shown in Table 3.

[Comparative Example 3]

An electric wire coating varnish was obtained in the same manner as in Example V-1, except that 1-methylbenzene-2, 4-diamine was used as a monomer of the polycarbodiimide. The viscosity of the electric wire coating varnish was 50 mpa·s. The resulting electric wire coating varnish was subjected to the same procedure as in Example V-1 to obtain a coated electric wire. The properties of the insulated coated electric wire are shown in Table 3.

The samples of Comparative Examples 2 to 3 showed marked embrittlement of the film after 100 hours of PCT. Thus, the electrical properties (dielectric constant, dielectric loss tangent and volume resistivity) could not be measured.

TABLE 3

| | | Ex. V-1 | Ex. V-2 | Comp. Ex. 2 | Comp. Ex. 3 |
|---|---|---|---|---|---|
| Dielectric constant (1 MHz) | normal state | 3.7 | 3.3 | 4.6 | 5.0 |
| | after 100 hrs of PCT | 4.7 | 3.7 | not measurable | not measurable |
| Dielectric loss tangent (1 MHz) | normal state | $4.0 \times 10^{-3}$ | $3.0 \times 10^{-3}$ | $3.0 \times 10^{-3}$ | $3.5 \times 10^{-3}$ |
| | after 100 hrs of PCT | $4.7 \times 10^{-2}$ | $1.0 \times 10^{-2}$ | not measurable | not measurable |
| Volume resistivity (Ω cm) | normal state | $1.0 \times 10^{16}$ | $1.0 \times 10^{16}$ | $1.0 \times 10^{16}$ | $1.1 \times 10^{16}$ |
| | after 100 hrs of PCT | $1.0 \times 10^{16}$ | $1.0 \times 10^{16}$ | not measurable | not measurable |
| Appearance | normal state | ○ | ○ | ○ | ○ |
| | after 100 hrs of PCT | ○ | ○ | X | X |

[Comparative Example 4]

1,5-Bis(4-aminophenoxy)pentane (21.02 g, 0.0734 mol), 3,3',4,4'-biphenyltetracarboxylic acid dianhydride (21.60 g, 0.0734 mol), and N-methylpyrrolidone (170.5 g) were charged into a 500 ml two-necked flask equipped with a stirrer. The charge was stirred for 12 hours at room temperature to synthesize a polyamid acid and obtain an electric wire coating varnish. The viscosity of the electric wire coating varnish was 3,000 mPa·s.

It was attempted to obtain a coated electric wire from the resulting electric wire coating varnish in the same manner as in Example V-1. However, the electric wire was cut during coating, because of high viscosity.

Industrial Applicability

The polycarbodiimide of the present invention has high solubility in an organic solvent, satisfactory workability, and excellent heat resistance and humidity resistance, and can be used as a heat resistant coating material, etc. in a soldering step in the production of electronic parts. The aromatic polycarbodiimide of the present invention is excellent in flexibility because of its structure. The insulated coated electric wire of the present invention has heat resistance, humidity resistance, and durability particularly in a high pressure, high humidity environment such as in a pressure cooker test, and can achieve a low dielectric constant. Thus, the insulated coated electric wire is excellent in high speed transmission, and can resolve electrical troubles such as crosstalk noise. Furthermore, the present invention can provide a highly reliable coated electric wire with high productivity, and is thus very valuable for commercial use.

What is claimed is:

1. An aromatic polycarbodiimide comprising a structural unit represented by the following formula (I):

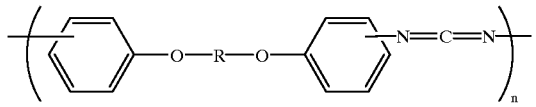

where R is an organic group having 3 or more carbon atoms, and n is an integer of 2 to 300.

2. The aromatic polycarbodiimide of claim 1, wherein n in the formula (I) is an integer of 2 to 100.

3. The aromatic polycarbodiimide of claim 1, wherein R in the formula (I) is an alkylene group having 3 or more carbon atoms.

4. The aromatic polycarbodiimide of claim 3, wherein R in the formula (I) is an alkylene group having 3 to 20 carbon atoms.

5. The aromatic polycarbodiimide of claim 3, wherein R in the formula (I) is an alkylene group having 4 to 50 carbon atoms.

6. The aromatic polycarbodiimide of claim 1, wherein R in the formula (I) is an alkylidene group having 3 or more carbon atoms.

7. The aromatic polycarbodiimide of claim 2, wherein R in the formula (I) is an alkylene group having 3 or more carbon atoms.

8. The aromatic polycarbodiimide of claim 7, wherein R in the formula (I) is an alkylene group having 3 to 20 carbon atoms.

9. The aromatic polycarbodiimide of claim 7, wherein R in the formula (I) is an alkylene group having 4 to 50 carbon atoms.

10. The aromatic polycarbodiimide of claim 2, wherein R in the formula (I) is an alkylidene group having 3 or more carbon atoms.

11. A polycarbodiimide solution prepared by dissolving at least one aromatic polycarbodiimide of claim 1 in an organic solvent.

12. A polycarbodiimide solution prepared by dissolving at least one aromatic polycarbodiimide of claim 3 in an organic solvent.

13. A polycarbodiimide solution prepared by dissolving at least one aromatic polycarbodiimide of claim 6 in an organic solvent.

14. An insulated coated electric wire coated with a resin composition consisting essentially of at least one aromatic polycarbodiimide of claim 1.

15. An insulated coated electric wire coated with a resin composition consisting essentially of at least one aromatic polycarbodiimide of claim 3.

16. An insulated coated electric wire coated with a resin composition consisting essentially of at least one aromatic polycarbodiimide of claim 6.

17. A polycarbodiimide sheet comprising a resin composition consisting essentially of at least one aromatic polycarbodiimide of claim 1.

18. A polycarbodiimide sheet comprising a resin composition consisting essentially of at least one aromatic polycarbodiimide of claim 3.

19. A polycarbodiimide sheet comprising a resin composition consisting essentially of at least one aromatic polycarbodiimide of claim 6.

* * * * *